United States Patent [19]

Myer

[11] 4,449,210
[45] May 15, 1984

[54] FIBER OPTIC HYDROPHONE TRANSDUCERS

[75] Inventor: Jon H. Myer, Woodland Hills, Calif.

[73] Assignee: Hughes Aircraft Company, El Segundo, Calif.

[21] Appl. No.: 332,791

[22] Filed: Dec. 21, 1981

[51] Int. Cl.³ .................................. H04R 17/00
[52] U.S. Cl. .................................... 367/149; 367/140; 350/96.29; 350/96.21
[58] Field of Search ................ 367/140, 141, 149; 350/96.20, 96.21, 96.29; 248/206 A, 309 R; 308/10

[56] References Cited

U.S. PATENT DOCUMENTS

| | | | |
|---|---|---|---|
| 2,991,347 | 7/1961 | Weinstein | 269/8 |
| 3,107,310 | 10/1963 | Carriere et al. | 308/10 |
| 3,152,716 | 10/1964 | Feldhahn | 52/DIG. 4 |
| 3,831,137 | 8/1974 | Cuomo | 367/141 |
| 4,071,753 | 1/1978 | Fulenwider et al. | 367/149 |
| 4,294,513 | 10/1981 | Nelson et al. | 367/140 X |
| 4,313,192 | 1/1982 | Nelson et al. | 367/79 |

FOREIGN PATENT DOCUMENTS

| | | | |
|---|---|---|---|
| 2916763 | 10/1979 | Fed. Rep. of Germany | 350/96.21 |
| 55-45051 | 3/1980 | Japan | 350/96.21 |

OTHER PUBLICATIONS

Fields et al., "Fiber Optic Pressure Sensor," *Journal of Acoustic Society of America*, vol. 67, No. 3, Mar. 1980, pp. 816–818.
Jennhomme et al., "Directional Coupler for Multimode Optical Fibers", *Applied Physics Letters*, vol. 29, No. 8, Oct. 1976.

*Primary Examiner*—Harold J. Tudor
*Assistant Examiner*—Tyrone Davis
*Attorney, Agent, or Firm*—Russell Ben Miller; William J. Bethurum; Anthony W. Karambelas

[57] ABSTRACT

Apparatus is provided including a light source, a transducer and a detector, which is capable of detecting applied acoustic signals. The transducer employs first and second ridged members which have parallel rippled surfaces which contact opposite sides of a fiber optic waveguide. Each rippled surface has a different predetermined ripple pitch which provides for variable sensitivity along one dimension of the transducer. Modulation of the position of the ridged members relative to one another by means of applied acoustic signals causes microbend attenuation of light transmitted through the waveguide. The modulation of the light provides an indication of the presence of the acoustic signals. The variation in dimensional sensitivity provided by the transducer allows for a determination of the direction of arrival of the acoustic signals. Appropriate selection of pitch and pitch ratio of the two rippled surfaces provides any desired spatial sensitivity distribution of the hydrophone. A transducer is also disclosed which further incorporates magnetic elements to provide a mechanical prestress bias to the waveguide, thus providing a frictionless and hysteresis-free device.

12 Claims, 4 Drawing Figures

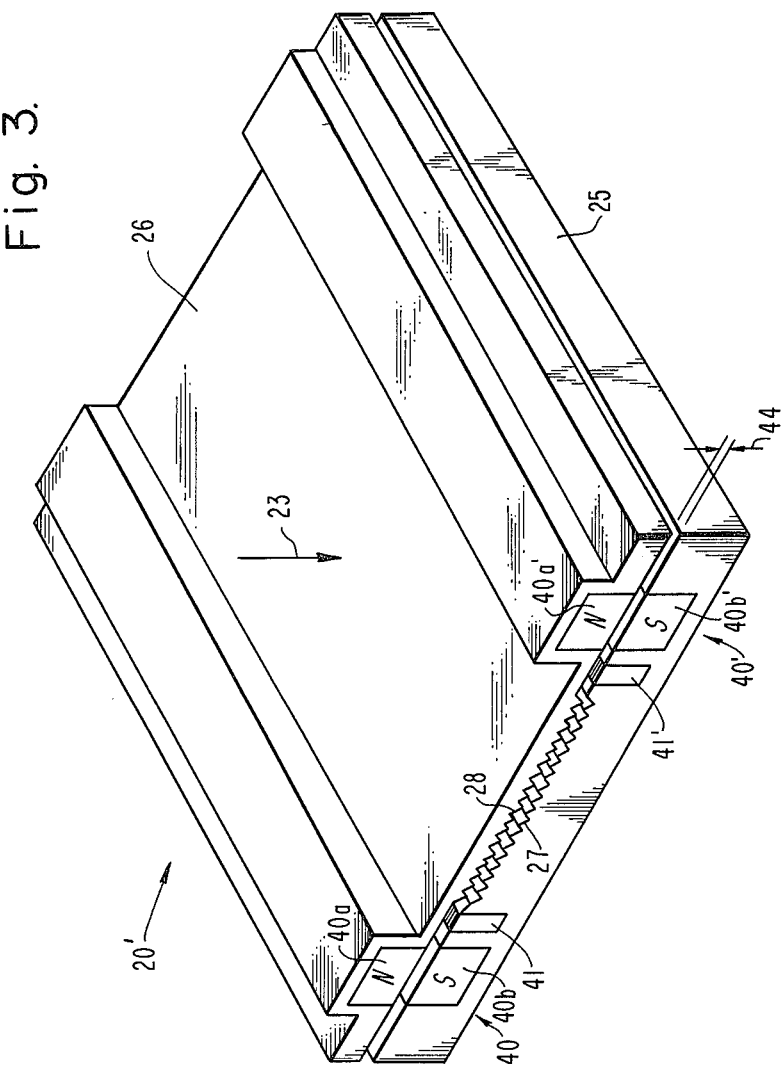

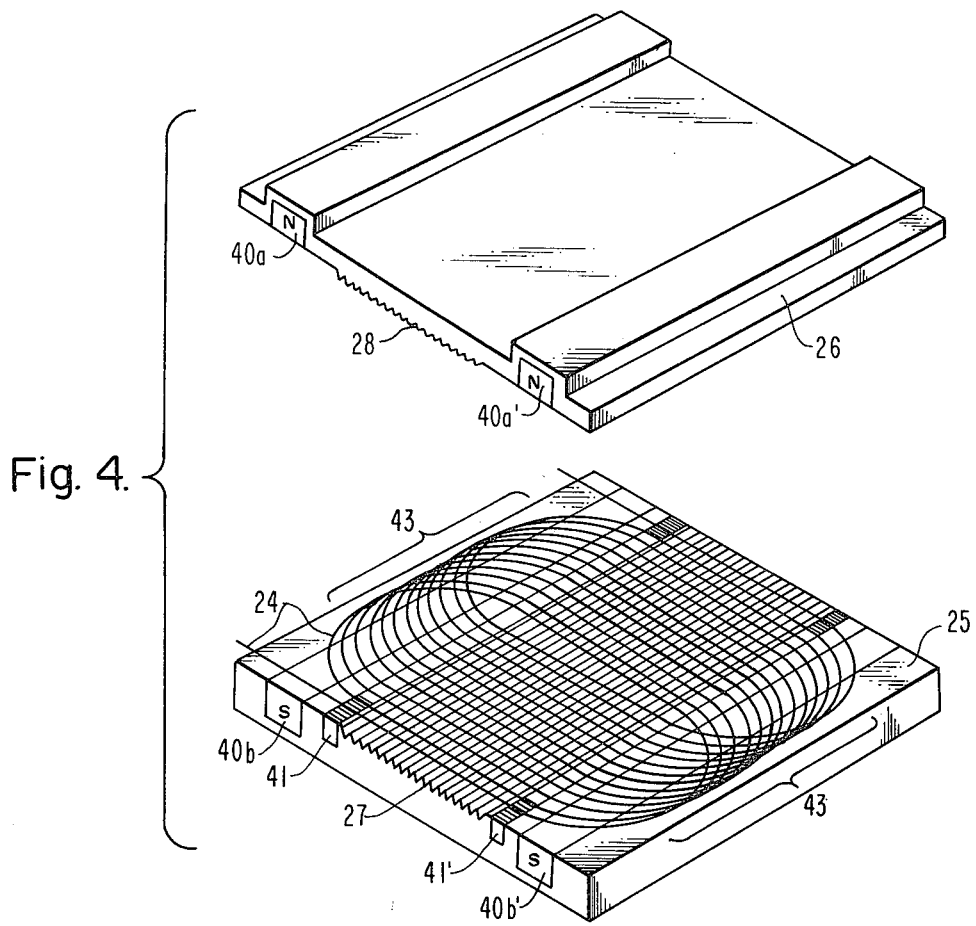

FIBER OPTIC HYDROPHONE TRANSDUCERS

BACKGROUND

The present invention relates generally to hydrophones and more particularly to hydrophones which employ optical waveguide transducers as sensing elements.

Heretofore, there has been much work related to development of hydrophones for use in sonar towed arrays, fixed coastal or deep water arrays, torpedo guidance systems, and the like. Piezoelectric transducers have been developed for use with these systems, but they have a number of problems. The towed array system has on the order of 250 channels, and each transducer channel consumes power on the order of 25 watts, resulting in approximately 6 kilowatts of power dissipated in the towed array. Furthermore, piezoelectric transducers are low efficiency devices at low acoustic frequencies, on the order of a few hundred hertz or below, and they exhibit non-uniform response at these frequencies. Additionally, these systems are very costly and have reliability problems due to their complexity. Piezoelectric transducers are sealed in a watertight enclosure containing an insulating oil. The transducers become inoperative when wet and cease to function. Thus, the hermetic seal of the enclosure must be excellent for the transducers to perform properly in a water environment.

Because of the above-mentioned difficulties with conventional detection systems, there has been interest in the development of fiber-optic, phase-modulated transducers. However, such transducers are sensitive to environmental factors, such as temperature changes, particularly at low-frequencies. The phase response of the fiber-optic materials to a temperature variation of 1° C. is larger than a response to a pressure change of 1Pa (Pascal) by a factor of more than $10^6$. Accordingly, temperature fluctations and the phase shifts resulting therefrom interfere severly with such phase-modulated systems.

Additionally, conventional hydrophone systems employ electrical conductors between the transducer elements and signal processor units. The conductors cause electrical connection problems due to the deterioration of solder joints and loose connector pins. Crosstalk between adjacent channels and elecromagnetic interference also detrimentally affect performance of such conventional systems. Furthermore, many conventional hydrophone systems require the use of preamplifiers located near or at the transducer to provide for sufficient signal strength for transmission to the signal processor. For an additional discussion of the drawbacks of conventional hydrophones, reference is made to U.S. Pat. No. 3,831,137 for "Acousto-Optic Underwater Detector".

Recent developments in the fiber optical waveguide art have led to the development of an optical coupler which utilizes the concept of mode conversion between etched optical fibers. The concept of mode conversion in optical fibers is relatively well-known in the art. Mode conversion in optical fibers as it relates to an optical coupler is discussed in a paper by L. Jeunhomme et al, entitled "Directional Coupler for Multimode Optical Fibers," *Applied Physics Letters,* October 1976. A system is disclosed therein as it pertains to an experiment for coupling energy out of a multimode optical fiber. The system employs aluminum gratings having opposed rippled surfaces with an optical fiber disposed therebetween. The system and experiments therein relate strictly to the study of mode conversion and optical coupling of energy out of the optical fiber, and does not relate to optical hydrophones for detecting acoustic signals. The system disclosed therein has a fixed lower grating and the upper grating is secured at a fixed position by means of a mechanical screw arrangement. The relative positions between the two gratings are meant to be manually adjustable so as to allow for optimal selective coupling out of the waveguide. Application of this device for the detection of acoustic signals was never considered, and it is neither disclosed nor suggested that the system therein could be used for such an application.

U.S. Pat. No. 4,071,753 entitled "Transducer for Converting Acoustic Energy Directly Into Optical Energy", by Fulenwider et al, discloses a transducer which employs an optical waveguide through which light is transmitted. As shown in FIG. 6 thereof, the light passing through the optical fiber may be modulated by means of bending the waveguide. The optical fiber is placed across two fixed supports and a diaphragm is coupled to the waveguide between the supports by means of a depending member which bares on the optical waveguide. Modulation of the position of the diaphragm in turn causes bending of the optical fiber. The bending of the optical fiber results in modulation of the light transmitted therethrough.

SUMMARY OF THE INVENTION

In order to overcome deficiencies in the prior art, the present invention provides for a fiber optic hydrophone transducer for detecting the magnitude and direction of applied acoustic signals. The transducer includes a light source, a detector, and an optical waveguide disposed relative to the light source and detector, which allows light to be transmitted therebetween. A pair of ridged members are disposed on opposite sides of the waveguide. The ridged members have juxtaposed rippled surfaces which contact the surface of the waveguide.

The improvement provided by the present invention comprises a configuration such that one of the ripple surfaces has a first predetermined ripple pitch, and the other of the ripple surfaces has a second different predetermined ripple pitch. The selection of the ripple pitch ratio is determinative of the spatial sensitivity distribution of a transducer. Because the two ripple surfaces have differing pitches, the different ridge positions provide different sensitivities. As a result certain ridges will be insensitive while other ridges will be sensitive to incoming acoustic signals. By appropriate selection of pitch and pitch ratio, any desired spatial sensitivity distribution may be provided. The applied acoustic signals modulate the light transmitted through the waveguide by means of microbend attenuation in the waveguide. The modulated light provides an indication of the presence of the acoustic signals.

In one particular implementation of the principles of the invention, the juxtaposed rippled surfaces of the ridged members are attracted to compress the waveguide by means of magnetic force. The result is a frictionless and hysteresis-free system. The magnetic force is generated by means of a plurality of magnets disposed in both ridged members. The optical waveguide is mechanically prestressed by means of the magnetically attracted ridged members. It is to be understood that the magnetic prestress may be provided to the transducer independently of the type of rippled surface which is employed in the rigid members. The attraction of the ridged members is important to this portion of the invention, not the particular ripple pitch of the rippled surfaces.

The modulation of the light transmitted through the waveguide is indicative of the presence of applied acoustic signals. The dimensional sensitivity provided by the different ripple pitches allows for the direction of arrival of the acoustic signals to be determined. Such variable sensitivity permits the construction of simple distributed sonar arrays.

BRIEF DESCRIPTION OF THE DRAWINGS

The various features and and advantages of the present invention may be more readily understood with reference to the following detailed description taken in conjunction in the accompanying drawings, wherein like reference numerals designate like structural elements, and in which:

FIG. 3 shows a magnetically coupled transducer employing the principles of the present invention; and FIG. 4 shows an exploded view of the transducer of FIG. 3.

DETAILED DESCRIPTION

Figure 1:
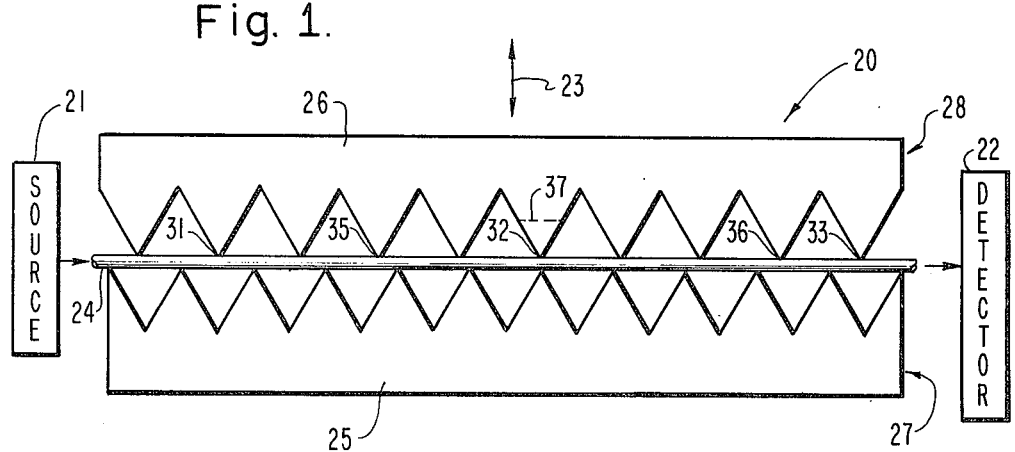
FIG. 1 illustrates a distributed beat frequency rippler hydrophone in accordance with the principles of the present invention.

FIG. 1 illustrates a distributed beat frequency rippler hydrophone in accordance with the principles of the present invention. The hydrophone comprises a light source 21, a transducer 20, and a detector 22. The transducer 20 is comprised of a pair of ridged members 25, 26. The first ridged member 25 has a plurality of ridges thereon with the ridges oriented in a ridge direction to form a rippled surface 27 which has a first predetermined pitch between adjacent ripples. The second ridge member 26 has a plurality of ridges thereon with the ridges oriented in a ridge direction which is parallel to the ridge direction of the ridges of the first ridged member to form a second rippled surface 28 which has a second predetermined pitch that is different from the pitch of the rippled surface 27. The ridges of the two members are parallel to each other and the pitch is measured in a direction perpendicular to the ridge direction. The ratio of the pitches of the different rippled surfaces is called the ripple pitch ratio. The two rippled surfaces 27, 28 are positioned to be in contact with the waveguide 24 which is disposed therebetween. The rippled surfaces of the two ridged members 25, 26 are juxtaposed in a parallel orientation. The light source 21 and detector 22 are positioned to transmit and receive light energy through the waveguide 24.

Applied acoustic signals 23 modulate the position of the second ridged member 26 with respect to the first ridged member 25. Accordingly, the two rippled surfaces 27, 28 cause microbending of the optical waveguide 24. The amount of microbending caused by the motion of the ridged members 25, 26 is determined by the relative positions of the ripples 27, 28. For example, ridges identified as 31, 32 and 33 of the second ridged member 26 have little effect on the amount of light transmitted through the waveguide 24. However, the ridges indicated by points 35, 36 of the second ridged member 26 have a great effect on the amount of light transmitted through the waveguide 24.

Figure 2:
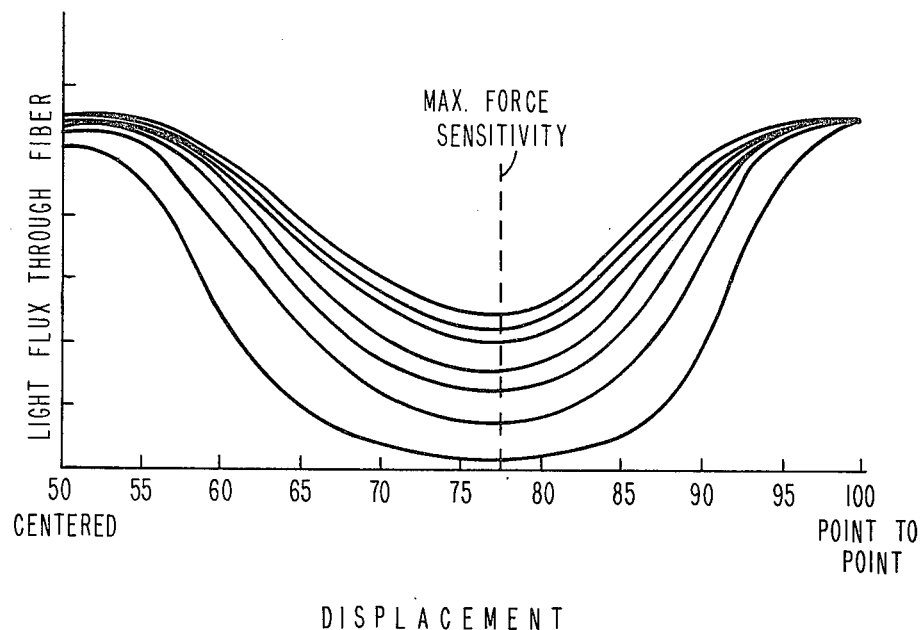
FIG. 2 shows a graph of light flux transmitted through the waveguide as a function of displacement.

Therefore, the selection of pitch and pitch ratio is critical to the operation of the transducer 20 of the present invention. The importance of contact position between the ridges 27, 28 and the waveguide 24 is illustrated in FIG. 2. FIG. 2 shows a graph of light flux transmitted through the waveguide 24 as a function of displacement. The left side of the graph shows the light flux transmitted when the ridges 27, 28 are centered relative to one another. The right side of the graph shows the flux transmitted through the waveguide 24 when the ridges 27, 28 match up point to point. As may be seen from FIG. 2 the point of maximum force sensitivity in the waveguide 24 is at a position roughly half way between the centered and point to point contact positions between the ridges 27, 28.

In the experiment which generated the data shown in FIG. 2, the waveguide 24 had a diameter of 135 micrometers, the ripple period was 254 micrometers. The point of maximum force sensitivity was found to be at 0.57 micrometers measured from one nearest ridge or 1.97 micrometers measured from the other nearest ridge. Thus, for this particular waveguide diameter and rippled period, the point of maximum force sensitivity is approximately 22.5% of the ripple period from one of two adjacent ridges, or 77.5% of the ripple period from the other of the adjacent ridges.

It is to be understood that each ridged member 25, 26 need not have only one ripple pitch associated therewith. Clearly more than one ripple pitch may be employed on each ridged member 25, 26 in order that several spatial frequencies may be formed along the waveguide 24. In addition, increased sensitivity and movement range of the transducer 20 may be had by eliminating the point to point contact positions. This may be done by eliminating the ripple identified at point 32 of the second ridged member 26, and indicated by dashed line 37 in the area of point 32.

Referring to FIG. 3, a transducer 20' employing the principles of the present invention is shown. This particular transducer 20' also comprises magnetic elements which provide the mechanical prestress of the optical waveguide. The transducer 20' comprises the first and second ridged members 25, 26 and their associated juxtaposed rippled surfaces 27, 28. The ridged members 25, 26 are suitably modified to incorporate a plurality of magnet pairs 40, 40' along opposite edges of the ridged members 25, 26. Corrugated guiding surfaces 41, 41' are disposed between the magnetic elements 40b, 40b' of the first ridged member 25. The corrugated guiding surfaces 41, 41' may be comprised of a fine gear rack, or other similar toothed device.

FIG. 4 shows an exploded view of the transducer 20' of FIG. 3. The waveguide 24 is shown as having a plurality of windings with straight segments lying across the rippled surfce 27. Return loops 43 of the waveguide 24 lie outside the guiding surfaces 41, 41' with portions of the waveguide lying between the teeth of the guiding surfaces 41, 41'. Thus, the waveguide 24 is supported and compressed by the rippled surfaces 27, 28 and guided by the guiding surfaces 41, 41'. The guiding surfaces 41, 41' secure the waveguide 24 in a fixed position relative to the rippled surfaces 27, 28. The loops 43 are disposed in the gap 44 between the two ridged members 25, 26 and hence have no stresses exerted thereon.

The ridged members 25, 26 are thus held together by the magnetic forces of the magnet pairs 40, 40'. The amount of magnetic force exerted by the magnetic pairs 40, 40' is selected to appropriately prestress the waveguide 24. The prestress acts to bias the waveguide 24 for the proper amount of multimode attenuation. This embodiment provides for a frictionless and hysteresis-free transducer configuration. Also, the ridged member 25, 26, may have any type of rippled surfaces, for the magnetic bias arrangement deals solely with the ridged members 25, 26 and not with the type of rippled surface.

A prototype model of the transducer 20' was built having a ripple pattern with a tip to tip period of 0.10 inches and 18 ridges in both ridged members. This provides 35 bends in a single waveguide pass through the transducer 20'. The winding of the waveguide 24 had 28 passes across the ridged members 27, 28, making a total of 28×35=980 bends in the complete hydrophone assembly. The deforming force acting to prestress the waveguide 24 (weight of second ridged member 26 plus magnetic attraction force) was 1200 grams. The transducer proved to be sensitive to variations in applied external forces, thus proving the validity of using magnetic force bias.

Thus, there has been described a new and improved optical hydrophone employing a beat frequency ripple transducer. The transducer design provides for variable sensitivity along one dimension of the hydrophone transducer. It is to be understood that the above-described embodiment is merely illustrative of one of the many possible specific embodiments which represent applications of the principles of the present invention. Clearly, numerous and varied other arrangements may readily be devised in accordance with these principles by those skilled in the art without departing from the spirit and scope of the invention.

I claim:

1. A fiber optic hydrophone for detecting applied acoustic signals, said hydrophone including a light source, a detector, a waveguide disposed to transmit light from said light source to said detector, and a first member having a plurality of ridges thereon positioned at a first predetermined pitch and a second ridged member having a plurality of ridges thereon positioned substantially parallel to said ridges on said first member to form first and second ridged members having parallel juxtaposed rippled surfaces in contact with the surface of said waveguide, wherein the improvement comprises:
one of said rippled surfaces having a first predetermined ripple pitch, the other of said rippled surfaces having a ripple pitch different than said first predetermined ripple pitch whereby the selection of the ripple pitch relationship determines the spatial sensitivity distribution of said hydrophone, so that applied acoustic signals modulate the light transmitted through said waveguide by means of microbend attenuation in the waveguide, the modulated light providing an indication of the presence of acoustic signals.

2. The hydrophone of claim 1 which further comprises:
magnetic means disposed in said ridged members for providing a mechanical prestress bias to said waveguide.

3. The hydrophone of claim 2 wherein said magnetic means comprises:
a plurality of pairs of magnetic elements disposed in said ridged members adjacent to said rippled surfaces.

4. The hydrophone of claim 1 which further comprises:
a plurality of guiding surfaces disposed adjacent to the rippled surface of one of said ridged members for securing said waveguide in a fixed position relative to said rippled surfaces, said waveguide being looped so that it engages said guiding surfaces so that said waveguide makes a plurality of passes between said first and second ridged members to increase the number of engagements between said rippled surfaces and said waveguide without increasing the number of ripples.

5. A transducer for use in a hydrophone which includes a light source, a detector, a waveguide disposed to transmit light from said light source to said detector, and a pair of ridged members having rippled surfaces with substantially parallel ridges with the ridges disposed in a juxtaposed relation, "said ridge members being movable with respect to each other and" touching the surface of said waveguide, wherein the improvement comprises:
one of said rippled surfaces having a first predetermined ripple pitch measured at right angles to the ridge direction and, the other of said rippled surfaces having a second different predetermined ripple spacing to control the directional sensitivity of said transducer.

6. The transducer of claim 5 which further comprises:
magnetic means disposed in said ridged members for providing a mechanical prestress bias to said waveguide.

7. The transducer of claim 6 wherein said magnetic means comprises:
a plurality of pairs of magnetic elements disposed in said ridged members adjacent to said rippled surfaces.

8. The transducer of claim 5 which further comprises:
a plurality of guiding surfaces disposed adjacent to the rippled surface of one of said rigid members for securing said waveguide in a fixed position relative to said rippled surfaces.

9. A transducer for use in a hydrophone which includes a light source, a detector, a waveguide disposed to transmit light from said light source to said detector, and a pair of ridged members having rippled surfaces which are disposed in a juxtaposed relation touching the surface of said waveguide, wherein the improvement comprises:
the spacing of the ripples on said pair of said ridged members being different so that the engagement by two substantially facing ridges on opposite ridged members is different than the relationship of other opposed ridges touching the surface of said waveguide at another portion along the length of said waveguide; and
magnetic means disposed in said ridged members for providing a mechanical prestress bias to said waveguide.

10. The transducer of claim 9 which further comprises:
one of said rippled surfaces having a first predetermined ripple pitch, the other of said rippled surfaces having a second different predetermined ripple pitch.

11. The transducer of claim 9 wherein said magnetic means comprises:

a plurality of pairs of magnetic elements disposed in said ridged members adjacent to said rippled surfaces.

12. The transducer of claim 11 which further comprises:

a plurality of guiding surfaces disposed adjacent to the rippled surface of one of said ridged members for securing said waveguide in a fixed position relative to said rippled surfaces.

* * * * *